Figure 1:
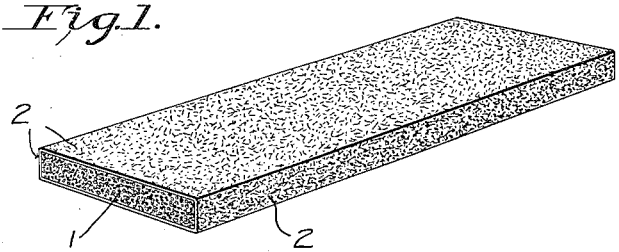

Aug. 12, 1930.  H. D. RANDALL  1,772,912

FLOCK COATED WINDOW GUIDE

Filed June 21, 1929

Inventor
Howard D. Randall
By Attorney
Nathan & Bowman

Patented Aug. 12, 1930

1,772,912

UNITED STATES PATENT OFFICE

HOWARD D. RANDALL, OF CINCINNATI, OHIO, ASSIGNOR TO THE RANDALL COMPANY, OF CINCINNATI, OHIO, A CORPORATION OF OHIO

FLOCK-COATED WINDOW GUIDE

Application filed June 21, 1929. Serial No. 372,733.

This invention relates to an improved article of manufacture, such for example as an anti-rattle guide for automobile window glass, etc.

To satisfactorily meet the demands of manufacturer and user, it is essential that a window guide for automobile use, shall be capable of being readily inserted into and permanently maintained in the usual channels in the window frame. It must prevent all rattle of the glass; it must be capable of withstanding all kinds of weather; it must not bind but, on the contrary, it must admit of easy adjustment of the window; it must not be affected injuriously by dust, and it must retain its attractive appearance and satisfactorily perform its functions over great periods of time.

Heretofore, in an endeavor to meet all these demands, manufacturers have resorted to the use of felt, this being the most satisfactory material known for the purpose. While felt guides have been reasonably satisfactory to the user, they have not been entirely satisfactory to the manufacturer, inasmuch as a felt capable of meeting all the demands of the trade is a relatively costly material and the use thereof has added materially to the cost of the car. Fabric covered guides also have been proposed but these too are expensive to manufacture.

This invention has for one of its objects to provide a material which may be used in the manufacture of window guides and which, when so used, will afford all the advantages of the felt guides, heretofore provided, and which will have an additional advantage in that the cost thereof will be materially less than the cost of felt.

This object has been attained by the provision of a relatively soft rubber channel or guide having adhesively secured to its inner surface a coating of finely powdered wool or other fibrous material, commonly known as "flock." The soft rubber provides the required cushioning effect for the glass while the coating of flock provides an anti-friction surface which admits of easy adjustment of the glass therein. The guide may be made in any suitable or preferred manner such as by molding or by folding. Likewise the flock may be secured thereto in any suitable way, but preferably it will be secured thereto by adhesion. If desired the exterior of the channel strip may also be coated with flock, to improve its appearance and to enhance adhesion between the strip and the frame within which it is held.

While this invention is shown and described in connection with channeled window guides it is to be understood that the invention also contemplates various other uses for the product, and such other uses are intended to be included within the scope of the appended claims.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
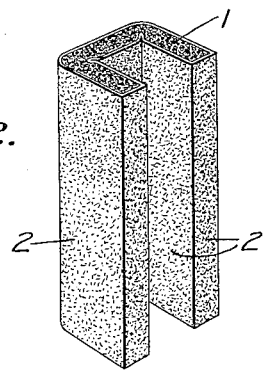
Figure 3:
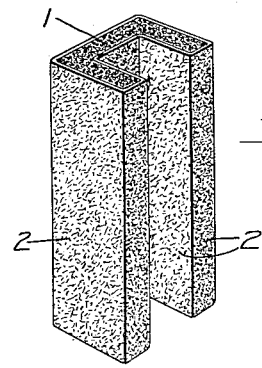
Figure 4:
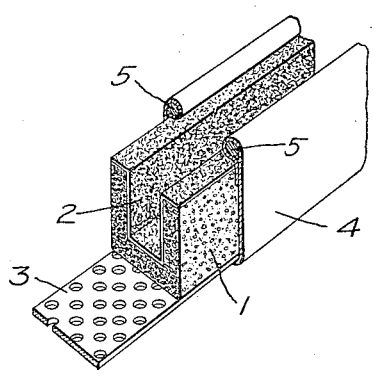

Figure 1 is a perspective view of one embodiment of this invention, comprising a flat strip of soft rubber coated with flock. Fig. 2 is a perspective view of a portion of a window guide made from the product illustrated in Fig. 1. Fig. 3 is a perspective view of a portion of a molded rubber window guide coated with flock, as proposed by this invention. Fig. 4 is a perspective view of a portion of still another form of window guide.

Referring more specifically to the drawings the invention is illustrated as comprising an elastic body 1 to which is adhesively secured, on one or more faces, a coating 2 of flock. Preferably the body is formed of soft rubber and the coating of flock may be adhesively secured thereto either by being deposited thereon while the rubber is in a tacky state, or by first applying to a non-tacky rubber a suitable adhesive coating and then depositing the flock thereon. Fig. 1 illustrates one product of the invention to wit:—a flat strip of rubber having a coating of flock but it is to be understood that the invention may also take various other forms.

In Fig. 2, there is illustrated an anti-rattle window guide formed by folding the product illustrated in Fig. 1. For this specific purpose the body member 1 preferably, but not necessarily, will be made of sponge rubber. This affords an ideal window guide for use in automobiles as the rubber base provides the necessary cushion for the glass and the coating of flock forms an anti-friction surface and produces an attractive velvet-like finish.

Fig. 3, illustrates a similar window guide in which the body member 1 is molded into U-shape and the coating of flock is applied thereto, as previously described.

In Fig. 4, there is disclosed still another form of window guide embodying this invention. In this form the body member 1 is provided with a stiffening element 3 preferably of perforated metal, and the body member and stiffening element are both encased within an outer covering 4 of any suitable material. The marginal portions of the covering preferably are each folded over a cord 5, thereby producing finishing beads which overlie the edges of the guide. As in each of the other forms, the guide has its glass-receiving channel coated with flock.

Figure 5:
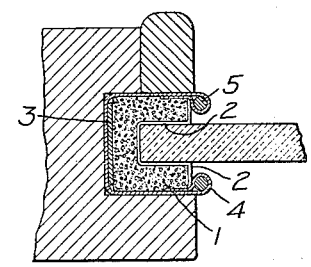

Fig. 5 is a sectional view showing parts of the glass and frame.

From the foregoing it will be perceived that this invention relates primarily to an article capable of functioning as a holder suitable for slidable glass windows of motor cars having an elastic base and surmounted by an anti-frictional surface, the holder being formed from a composite material consisting of sponge rubber and a flock coating possessing all the advantages of the much more expensive guides heretofore provided.

It is apparent that by applying the flock to the sponge rubber while in a tacky state or in any similar manner the surface exposed to the glass has the desirable frictional quality due to the flock, while retaining the flexible quality of the rubber, and in effect there is thus presented a guide-strip having a substantially impervious surface yet containing within itself sufficient frictional capacity for engagement with the smooth surface of the glass window. Furthermore, the porosity of the sponge rubber within this outer coating of flock is in no manner reduced, thereby retaining the desirable cushioning effect of the rubber strip. It must also be apparent that the viscosity of the sponge rubber and the cellular characteristics of the sponge rubber make it peculiarly adapted to this coating of flock. The pervious character of the rubber not only gives to it the desirable cushioning effect but the interstices form a suitable base for the engagement of the flock.

If an adhesive is used, the porous character of the rubber forms an excellent base for the adhesive, and in this way the invention dispenses with a multi coating of the rubber before applying the flock. Moreover, the character of the sponge rubber lends itself particularly well to the application of the coating of flock, dispensing with the use of any intermediate agencies that will reduce the flexible or frictional characteristics of the contacting surface of the strip. Hence this guide-strip is peculiarly adapted for use on motor cars where there is great difficulty in avoiding objectionable rattles. The stiffening metal strip has peculiar advantages herein with the flexible frictional surface and the inner porous body portion of rubber because it adds the requisite stiffness at a point well removed from the contacting point of rubber and glass.

Having thus revealed this invention, I claim as new and desire to secure the following combinations and elements, or equivalents thereof, by Letters Patent of the United States:

1. An anti-rattle guide-strip for automobile window glass comprising a metal base, a layer of porous sponge rubber secured to said metal base, a coating of flock adhesively secured to the viscous surfaces of said sponge rubber particles of flock being embedded within the cells of sponge rubber thereby preserving the porosity of the sponge rubber and forming an impervious frictional lining of flexible character for said strip.

2. An anti-rattle guide-strip for automobile window glass comprising a layer of porous sponge rubber, a coating of powdered fibrous material placed upon the surface of said rubber, particles of said fibrous material being commingled with particles of said sponge rubber forming an impervious frictional lining having a substantially smooth outer surface and an inner surface, particles of which are inseparable from the particles of rubber.

3. As an article of manufacture, a channeled strip having an inner cellular body portion, a lining of flock extending within the cells of said body portion and adhesively secured thereto forming a flexible frictional engaging surface impervious to moisture and dirt, the cellular body portion forming a cushioning device.

In witness whereof, I have hereunto subscribed my name.

HOWARD D. RANDALL.